US011580739B2

(12) United States Patent
Shirakawa

(10) Patent No.: US 11,580,739 B2
(45) Date of Patent: Feb. 14, 2023

(54) DETECTION APPARATUS, DETECTION METHOD, AND COMPUTER PROGRAM PRODUCT

(71) Applicant: KABUSHIKI KAISHA TOSHIBA, Minato-ku (JP)

(72) Inventor: Yuta Shirakawa, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 123 days.

(21) Appl. No.: 17/000,568

(22) Filed: Aug. 24, 2020

(65) Prior Publication Data
US 2021/0287010 A1    Sep. 16, 2021

(30) Foreign Application Priority Data
Mar. 12, 2020    (JP) .............................. JP2020-043274

(51) Int. Cl.
  *G06V 20/40*    (2022.01)
  *G06V 10/98*    (2022.01)
  *G06V 40/20*    (2022.01)

(52) U.S. Cl.
  CPC .............. *G06V 20/46* (2022.01); *G06V 10/98* (2022.01); *G06V 20/41* (2022.01); *G06V 20/49* (2022.01); *G06V 40/20* (2022.01); *G06V 20/44* (2022.01)

(58) Field of Classification Search
None
See application file for complete search history.

(56) References Cited

U.S. PATENT DOCUMENTS

| | | | |
|---|---|---|---|
| 2018/0218303 A1* | 8/2018 | Cole | G06F 40/216 |
| 2019/0035431 A1* | 1/2019 | Attorre | G11B 27/036 |
| 2019/0087965 A1* | 3/2019 | Datta | G06T 7/254 |
| 2019/0114487 A1* | 4/2019 | Vijayanarasimhan | G06V 20/47 |
| 2019/0205652 A1* | 7/2019 | Ray | G06V 20/47 |
| 2019/0248487 A1* | 8/2019 | Holtz | B64C 39/024 |
| 2019/0266407 A1* | 8/2019 | Gupta | G06K 9/6273 |
| 2020/0097643 A1* | 3/2020 | Uzun | G06F 21/32 |

(Continued)

OTHER PUBLICATIONS

Chao, Y-W. et al., "Rethinking the Faster R-CNN Architecture for Temporal Action Localization," CVPR2018, arXiv:1804.07667 [cs.CV], 2018, 10 pages.

*Primary Examiner* — Santiago Garcia
(74) *Attorney, Agent, or Firm* — Oblon, McClelland, Maier & Neustadt, L.L.P.

(57) ABSTRACT

A detection apparatus includes one or more processors. The processors set at least one time-period candidate. The processors input, to a first model that inputs a feature acquired from a plurality of time-series images and the time-period candidate and outputs at least one first likelihood indicating a likelihood of occurrence of at least one action previously determined as a detection target and correction information for acquisition of at least one correction time period resulting from correction of the at least one time-period candidate, the feature and the time-period candidate, and acquire the first likelihood and the correction information output from the first model. The processors detect, based on the at least one correction time period acquired based on the correction information and the first likelihood, the action included in the time-series images and a start time and a finish time of a time period of occurrence of the action.

12 Claims, 13 Drawing Sheets

(56) References Cited

U.S. PATENT DOCUMENTS

| | | | |
|---|---|---|---|
| 2020/0117906 A1* | 4/2020 | Lee | G06K 9/627 |
| 2020/0387715 A1* | 12/2020 | Hasegawa | G05B 19/418 |
| 2021/0019558 A1* | 1/2021 | Edge | G06F 16/245 |
| 2021/0090608 A1* | 3/2021 | Zhang | H04N 5/265 |
| 2021/0210119 A1* | 7/2021 | Jia | G06V 20/48 |
| 2021/0256250 A1* | 8/2021 | Cho | G06N 3/0454 |
| 2021/0271892 A1* | 9/2021 | Luo | G06V 40/103 |
| 2021/0390712 A1* | 12/2021 | Shimizu | G06V 20/40 |

* cited by examiner

DETECTION APPARATUS, DETECTION METHOD, AND COMPUTER PROGRAM PRODUCT

CROSS-REFERENCE TO RELATED APPLICATIONS

This application is based upon and claims the benefit of priority from Japanese Patent Application No. 2020-043274, filed on Mar. 12, 2020; the entire contents of which are incorporated herein by reference.

FIELD

Embodiments described herein relate generally to a detection apparatus, a detection method, and a computer program product.

BACKGROUND

There is a proposed action time-period detection technology of acquiring, from a time-series image (moving image or video), the likelihood of a category indicating action, the category name, the start time of action, and the finish time of action. For example, there is a proposed technology of estimating time-period candidates independent of categories through a model (model M1) from a feature computed from the entirety of a moving image and estimating a likelihood through another model (model M2) every estimated time-period candidate.

However, in some cases, the conventional technology has difficulty in properly detecting categories and the time period for each category (start time and finish time). For example, the technology with two models (model M1 and model M2) as above has difficulty in estimating a proper time period every category in some cases because the model M1 estimates time-period candidates independent of categories.

DETAILED DESCRIPTION

According to one embodiment, a detection apparatus according to an embodiment includes one or more processors. The processors set at least one time-period candidate. The processors input, to a first model that inputs a feature acquired from a plurality of time-series images and the at least one time-period candidate and outputs at least one first likelihood indicating a likelihood of occurrence of at least one action previously determined as a detection target and correction information for acquisition of at least one correction time period resulting from correction of the at least one time-period candidate, the feature and the at least one time-period candidate, and acquire the first likelihood and the correction information output from the first model. The processors detect, based on the at least one correction time period acquired based on the correction information and the first likelihood, the action included in the time-series images and a start time and a finish time of a time period of occurrence of the action.

Detection apparatuses according to preferred embodiments will be described in detail below with reference to the drawings.

Examples in which the action or motion of a person is mainly detected from a time-series image, will be given below, but a detection target is not limited to the action of a person. The action of a movable object different from a person, such as an animal, a robot, a vehicle, or a flight vehicle, may be detected.

First Embodiment

A detection apparatus according to a first embodiment computes a proper time period every category through an estimation model having the criteria of a plurality of time-period candidates. This arrangement enables improvement in the accuracy of time-period detection and improvement in the accuracy of action category detection.

Figure 1:
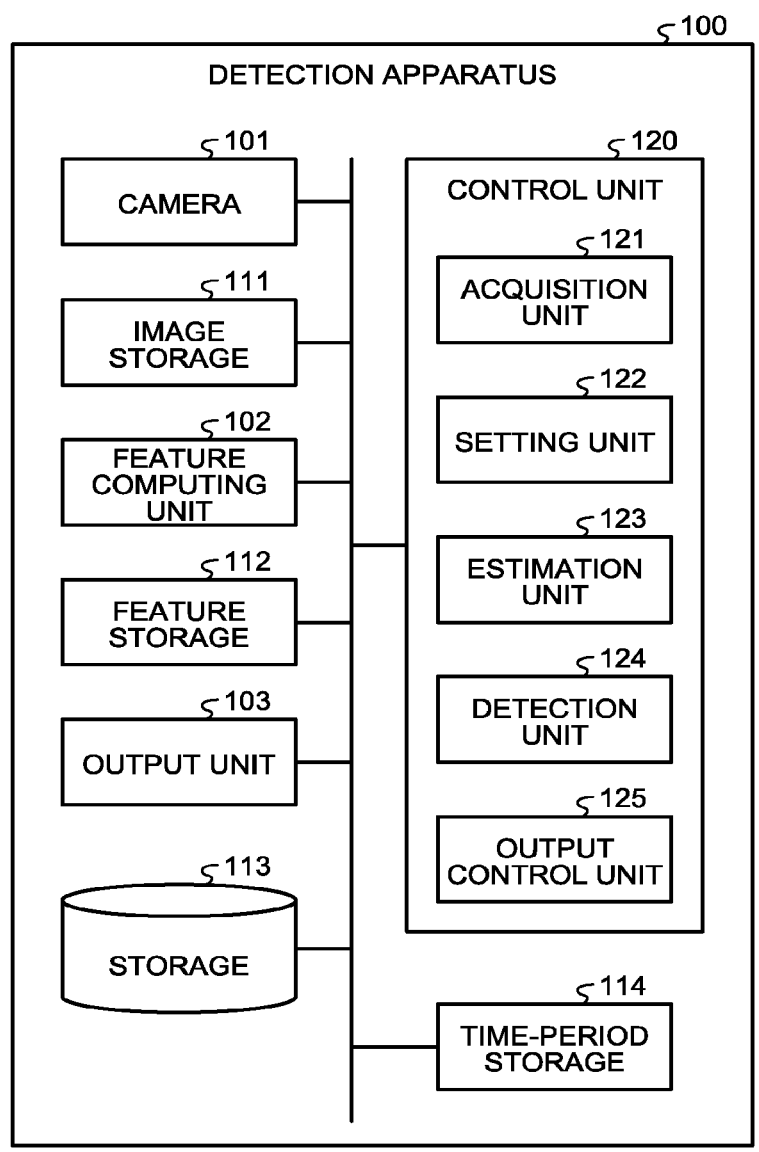
FIG. 1 is a block diagram of a detection apparatus according to a first embodiment.

FIG. 1 is a block diagram of an exemplary configuration of the detection apparatus 100 according to the first embodiment. The detection apparatus 100 of the present embodiment is, for example, a detection apparatus (detection system) that shoots an area in which a person is seen and detects the time period of occurrence of the action (specific action) of a previously determined category (type) and the category, from the shot moving image. Hereinafter, in some cases, the category of an action previously determined as a detection target is referred to as an action category.

In the present embodiment, an example will be given in which a detection apparatus detects five action categories (motions) in the following (A1) to (A5) with a monitoring camera that monitors an action that a customer takes, for example, in a store in commercial facilities. As described above, the detection apparatus 100 can be included in a monitoring camera system.

(A1) Motion in which merchandise is taken out from a shelf (A2) Motion in which merchandise is returned to a shelf (A3) Motion in which merchandise is put into a shopping basket (A4) Motion in which merchandise is taken out from a shopping basket (A5) Motion in which merchandise is hidden in the clothes of one's own The detection apparatus 100 analyzes, from a moving image shot by a camera, whether a person seen in the moving image is taking any of the actions in the five action categories above. In a case where any of the actions is being taken, the detection apparatus 100 analyzes what time period the action is being taken in. The detection apparatus 100 outputs a time period, the corresponding action category, and the goodness of fit of occurrence of the action indicated by the action category (likelihood or score), acquired from an analytical result. Hereinafter, in some cases, the likelihood for each action category as above is referred to as an action category likelihood (first likelihood). In a case where any action category requiring notifying is detected, the detection apparatus 100 performs output processing, for example, for calling watchman's attention.

Note that an action category to be detected is not limited to the above examples, and thus any category may be detected. For example, the detection apparatus 100 may detect, from a moving image in which a game of a sport is shot (e.g., basketball), an action taken by a player (e.g., a shot or a dribble) and the start time and finish time of the action.

As illustrated in FIG. 1, the detection apparatus 100 includes a camera 101, image storage 111, a feature computing unit 102, feature storage 112, an output unit 103, storage 113, time-period storage 114, and a control unit 120.

The image storage 111 functions as an image queue that stores an image captured by the camera 101. For example, the image storage 111 stores a prescribed length of images (frames). In a case where the length of images stored exceeds the prescribed length, the image storage 111 drops images in the chronological order of storage, so that the prescribed length is retained.

The feature storage 112 functions as a feature queue that stores a feature computed by the feature computing unit 102. For example, the feature storage 112 stores a prescribed length of features. In a case where the length of features stored exceeds the prescribed length, the feature storage 112 drops features in the chronological order of storage, so that the prescribed length is retained.

The storage 113 is a storage medium that stores various types of information for use in various types of processing that the detection apparatus 100 performs. For example, for later reproduction, the storage 113 stores an image (moving image) shot by the camera 101, separately from the image storage 111. The time-period storage 114 functions as a time-period queue that stores information regarding a time period computed by the control unit 120.

Note that each storage (the image storage 111, the feature storage 112, the storage 113, and the time-period storage 114) may be any storage medium for general use, such as a flash memory, a memory card, a random access memory (RAM), a hard disk drive (HDD), or an optical disk.

Part of the storages may be physically different in storage medium from the other or the storages may be physically different in storage medium from each other. Part or all of the storages may be achieved as different storage regions in physically the same storage medium. Furthermore, the storages each may be achieved with a plurality of physically different storage media. For example, in a case where the detection apparatus 100 is provided as one computer (e.g., a server computer or a personal computer), each storage may be physically one storage medium.

The camera 101 shoots, for example, a monitoring target area and outputs a time-series image (moving image). For example, the camera 101 captures dozens of frames each including an image (one-screen still image), every second, to shoot a moving image. The camera 101 stores as many captured frames as needed later for a user to look through a detection result together with the moving image for the corresponding time period, as a recording, in the storage 113. Moreover, for computation of a feature having aggregated distinctive information regarding the moving image, the camera 101 adds (stores) captured frames continuously into the image storage 111.

Figure 2:
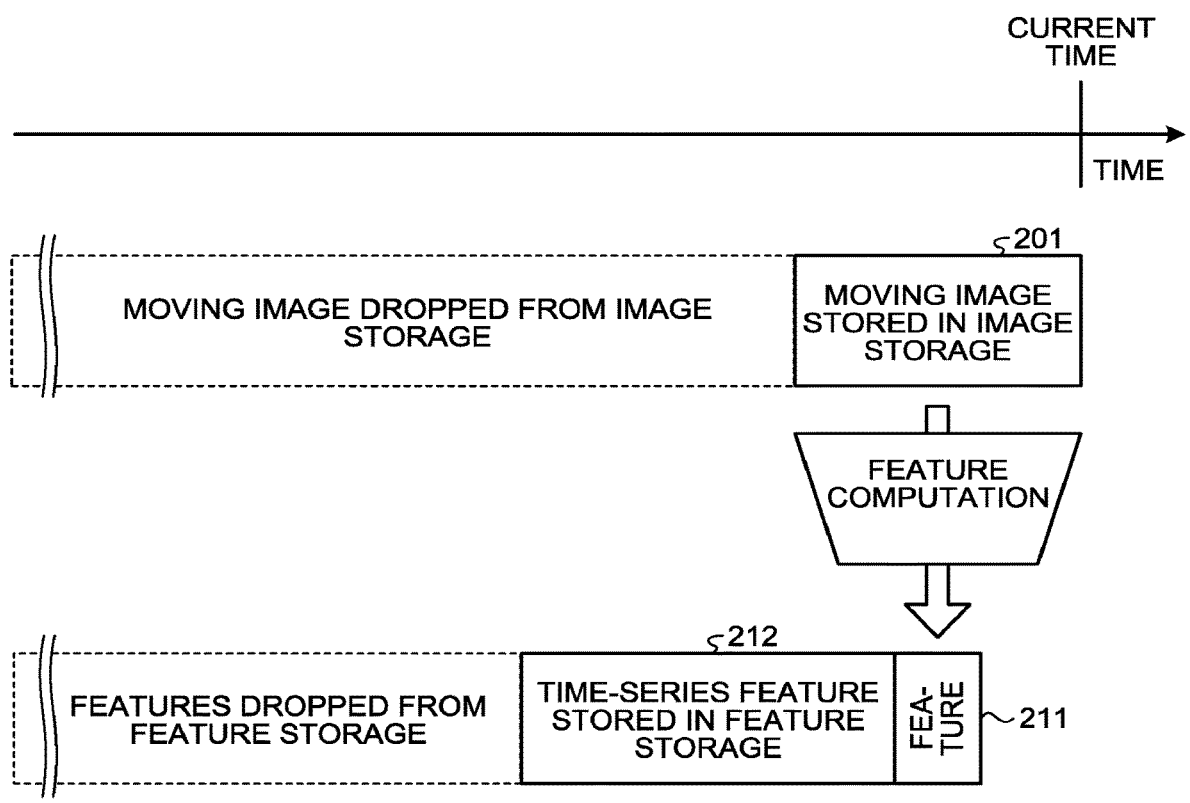
FIG. 2 illustrates exemplary feature computation.

The feature computing unit 102 analyzes the moving image stored in the image storage 111 and computes a feature from the moving image. FIG. 2 illustrates exemplary feature computation. For example, every certain time interval, the feature computing unit 102 reads a moving image 201 stored in the image storage 111, and computes a feature from the read moving image 201. A feature 211 computed every constant time interval is added to a feature 212 stored in the feature storage 112. The feature computing unit 102 may output a time-series feature corresponding to a certain length of time period, periodically, from the features stored in the feature storage 112. The output certain length of feature is acquired, for example, by the control unit 120, so as to be used in action category detection.

For example, the feature computing unit 102 computes a feature, with a model for feature computation that has learnt so as to input a moving image thereto and output a feature. For example, the model for feature computation learns so as to output a feature based on a variation in the value of brightness corresponding to position in at least one still image or a temporal variation in the value of brightness between at least two still images adjacent to each other. The model for feature computation is, for example, a neural network model.

The feature computing unit 102 may use, as a feature, the internal state in the last one before a category output layer in a neural network (exemplary model for feature computation) that has in advance learnt so as to classify a short trimmed video into an action category. For example, the feature computing unit 102 may use, as a feature, the internal state in the last one before a category output layer in a neural network that has in advance learnt so as to classify videos in which the action categories (motions) in the above (A1) to (A5) are seen, into (A1) to (A5).

The camera 101 and the image storage 111 may be physically integrally formed. The feature computing unit 102 and the feature storage 112 may be physically integrally formed. Moreover, the camera 101, the image storage 111, the feature computing unit 102, and the feature storage 112 may be physically integrally formed.

For example, an apparatus including the camera 101, the image storage 111, the feature computing unit 102, and the feature storage 112, may be provided every monitoring target area. Each apparatus may transmit a feature to the control unit 120 through a network. The network may be any form, and is, for example, the Internet. The network may be wired or wireless.

The output unit 103 is a device that outputs, for example, a detection result. The output unit 103 includes, for example, a display device (e.g., a display and a lighting device) and a sound output device (e.g., a speaker). The output unit 103 may be provided outside the detection apparatus 100. For example, the output unit 103 may be an information processing apparatus (e.g., a personal computer or a server computer) that is connected with the control unit 120 through a network (e.g., the Internet).

The control unit 120 detects the action category likelihood, the category name, the start time of action, and the finish time of action, with reference to a feature that is computed by the feature computing unit 102 and is stored in the feature storage 112. The control unit 120 includes an acquisition unit 121, a setting unit 122, an estimation unit 123, a detection unit 124, and an output control unit 125.

The acquisition unit 121 acquires various types of information that the control unit 120 uses. For example, the acquisition unit 121 acquires a time-series feature computed by the feature computing unit 102, and outputs the time-series feature to the estimation unit 123.

The setting unit 122 sets at least one time-period candidate as a time-period candidate for action category detection. The at least one time-period candidate set is used as an input to an estimation model (first model) for action category estimation. For example, the setting unit 122 reads a previously determined time-period candidate from the storage 113, and outputs the read time-period candidate to the estimation unit 123.

The setting unit 122 may select a time-period candidate to be set, in accordance with the acquired feature. For example, with a model (e.g., a neural network model) that inputs a feature thereto and outputs at least one time-period candidate, the setting unit 122 selects at least one time-period candidate corresponding to the acquired feature, and sets the time-period candidate selected. A method of selecting a time-period candidate corresponding to the acquired feature is not limited to this. For example, the storage 113 may store a feature and at least one time-period candidate in association, and the setting unit 122 may select a time-period candidate corresponding to the acquired feature from the storage 113. Such processing enables improvement of temporal detection accuracy for a detection result.

Figure 3:
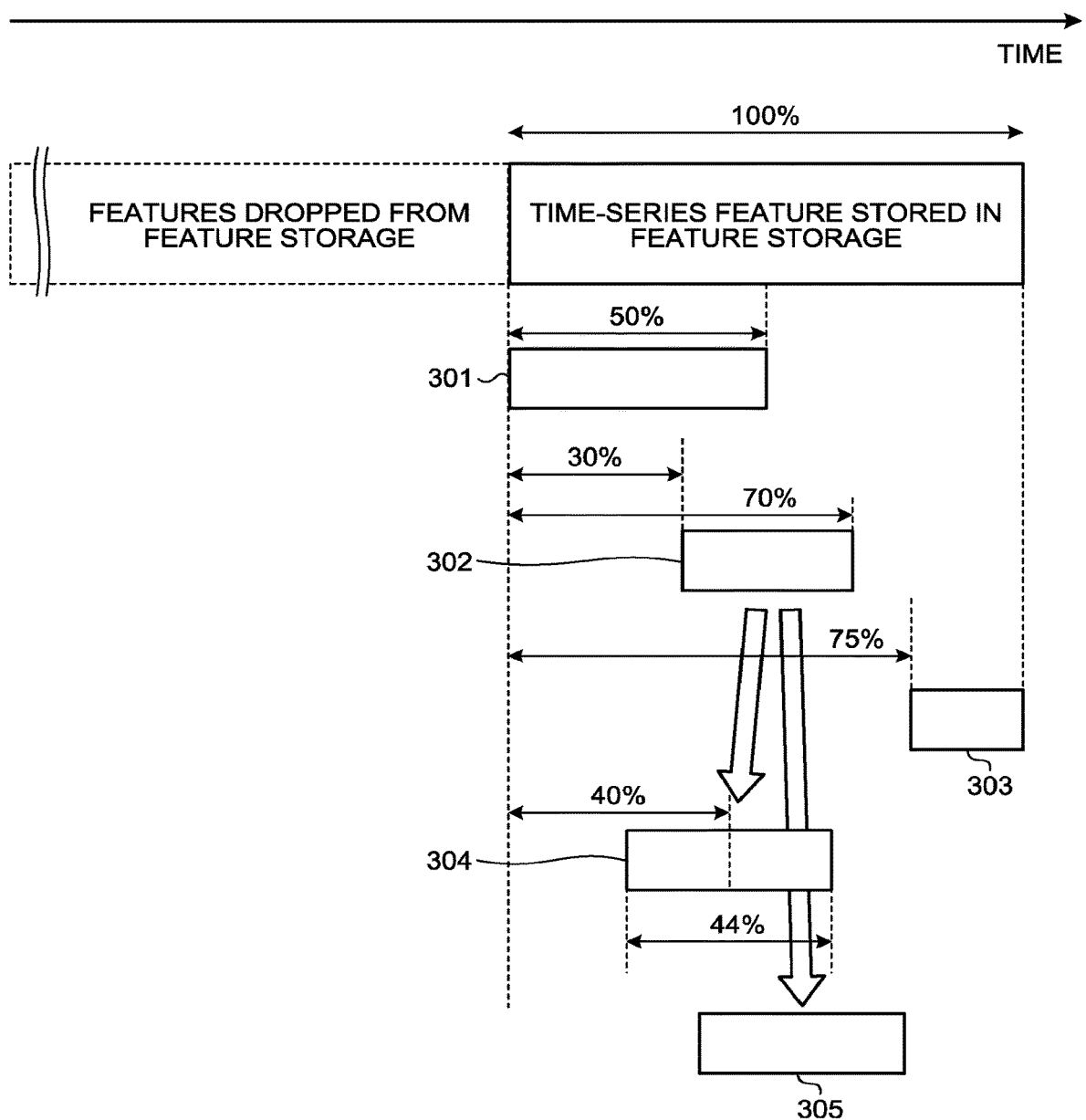
FIG. 3 illustrates exemplary time-period candidates.

For example, a time-period candidate is determined on the basis of a relative position to a certain length of time period (certain time period) corresponding to a certain length of feature stored in the feature storage 112. FIG. 3 illustrates exemplary time-period candidates. For example, time-period candidates are determined as follows:

A time-period candidate 301 corresponding to a time period ranging from the start time of a certain time period by 50% of the certain time period, namely, the first half of the certain time period A time-period candidate 302 corresponding to a time period ranging from the time having passed by 30% of the certain time period after the start time of the certain time period to the time having passed by 70% of the certain time period after the start time of the certain time period, namely, 40% of the certain time period at the center of the certain time period A time-period candidate 303 corresponding to 25% of the certain time period backward from the end of the certain time period An example in which such three time-period candidates are set, will be given below. The three time-period candidates are not limitative, and thus at least one time-period candidate may be set at any position and in any range.

From the time-series feature acquired by the acquisition unit 121 and the time-period candidates set by the setting unit 122, the estimation unit 123 estimates the action time period for each action category (start time and finish time) and the action category likelihood. For example, the estimation unit 123 performs estimation, with an estimation model, such as a neural network.

The estimation model is, for example, a model that has learnt so as to input a time-series feature and time-period candidates thereto and output an action category likelihood and a time-period correction (exemplary correction information) every action category. A time-series feature to be input to the estimation model is, for example, a prescribed length of features stored in the feature storage 112. A correction indicates the amount of correction of a time-period candidate to a time period of which the action category likelihood is larger than the action category likelihoods of the other time periods. For example, the time period of which the action category likelihood is larger than the action category likelihoods of the other time periods is a time period of which the action category likelihood is maximum.

A model may be used that outputs, instead of a correction, a time period resulting from correction of a time-period candidate to a time period of which the action category likelihood is larger than the action category likelihoods of the other time periods (other exemplary correction information). The estimation unit 123 inputs a feature and time-period candidates to such an estimation model, and acquires an action category likelihood and correction information (correction or corrected time period) output from the estimation model.

An example in which a correction is used as correction information, will be mainly given below.

The estimation model outputs an individual correction to each time-period candidate and each action category. That is, according to the present embodiment, a maximum likelihood correction and an action category likelihood are computed to each of combinations of 15 patterns of the three time-period candidates and the five action categories (three candidates×five categories).

Each correction includes the amount of shifting in time and the amount of scaling in time. For example, the correction of the time-period candidate 302 to the action category (A1) ("motion in which merchandise is taken out from a shelf") includes information that the center is shifted to the past side by 10% of the certain time period and the length of time is scaled up by 10%. In accordance with the correction, the time-period candidate 302 having the center located at 50% of the certain time period and a continuous length of 40%, is corrected to a correction time period 304 having the center located at 40% of the certain time period from the start time of the certain time period and a continuous length of 44% of the certain time period. Moreover, the correction to the action category (A2) ("motion in which merchandise is returned to a shelf") is computed similarly. In accordance with the correction, for example, the time-period candidate 302 is corrected to a time-period candidate 305. Similarly, correction based on the remaining action categories (A3) to (A5) is performed to the time-period candidate 302. Moreover, correction based on the five action categories (A1) to (A5) is performed to the other time-period candidates 301 and 303.

The estimation unit 123 computes a correction and additionally computes, for example, as a value of from 0 to 1, the action category likelihood of a correction time period to the corresponding action category. The estimation unit 123 adds, to the time-period storage 114, information in which the correction time period resulting from application of the correction to the corresponding time-period candidate is associated with the action category likelihood (estimation information).

On the basis of the correction time period and the action category likelihood stored in the time-period storage 114, the detection unit 124 detects information indicating an action included in the moving image and the start time and finish time of the time period of occurrence of the action (detection time period). The information indicating an action is, for example, the name of an action category (action category name). The detection unit 124 may output the final action category likelihood (detection score) corresponding to the detection time period.

For example, in a case where the estimation results (correction time periods) stored in the time-period storage 114 are out of date, the detection unit 124 computes a definite detection result from the correction time periods and the action category likelihoods stored in the time-period storage 114, and then outputs the definite detection result to the output control unit 125. The detection unit 124 drops information regarding the correction time periods used in the computation of the definite detection result, from the time-period storage 114.

The detection unit 124 determines whether correction time periods are out of date, for example, in accordance with the following criteria.

(R1) The time-series feature that the feature computing unit 102 outputs no longer include the correction time periods stored in the time-period storage 114.

(R2) A certain time or more has elapsed from the time at which new correction time periods computed by the estimation unit 123 do not overlap with the correction time periods stored in the time-period storage 114.

Processing in which the detection unit 124 computes a definite detection result, includes the following two pieces of elimination processing.

(S1) Processing of eliminating an estimation result low in action category likelihood from the estimation results stored in the time-period storage 114

(S2) Non-maximum suppression processing (hereinafter, referred to as NMS processing) in which, with a plurality of correction time periods large in time-period overlap as targets, the correction time period highest in action category likelihood is left among the plurality of correction time periods and then the estimation results corresponding to the other correction time periods are eliminated In (S1), for example, the detection unit 124 compares the action category likelihood corresponding to each correction time period with the criterion value of the action category, and then removes a correction time period of which the action category likelihood is not more than the criterion value, from the estimation results. For example, the criterion value of each action category is stored in the storage 113, so as to be referenced by the detection unit 124.

In (S2), for example, on the basis of the degree of overlap between correction time periods, the detection unit 124 selects estimation results to be subjected to the NMS processing. For example, the detection unit 124 computes the degree of overlap on the basis of temporal intersection over union (tIoU), to select, as targets, estimation results of which the computed tIoU is larger than the criterion value of the tIoU. For example, the criterion value of the tIoU is stored in the storage 113, as to be referenced by the detection unit 124. The criterion value of the tIoU is set to a value that is larger than zero and is not more than 1 (e.g., 0.5).

Figure 4:
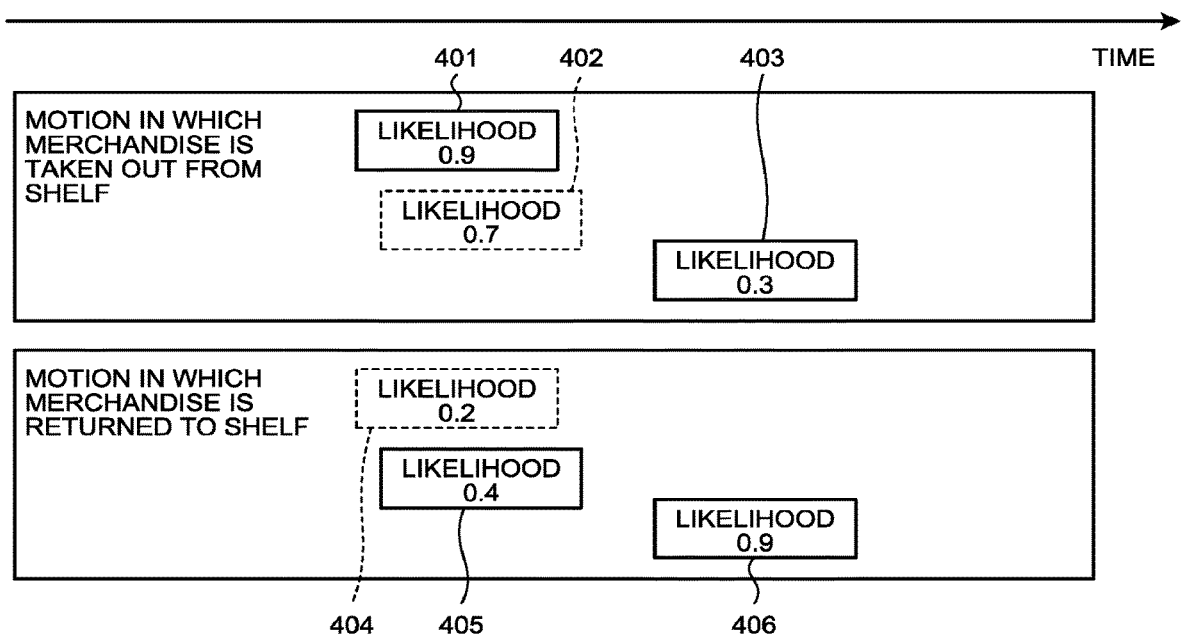
FIG. 4 illustrates exemplary NMS processing that is performed every category.

The NMS processing may be performed every category or may be performed with no distinction between categories. FIG. 4 illustrates exemplary NMS processing that is performed every category. FIG. 4 illustrates an example in which the NMS processing is performed to each of the action category (A1) ("motion in which merchandise is taken out from a shelf") and the action category (A2) ("motion in which merchandise is returned to a shelf"). For the action category (A1), correction time periods 401, 402, and 403 are stored in the time-period storage 114.

The detection unit 124 first defines estimation results including the correction time periods 401, 402, and 403 as indefinite detection results. The detection unit 124 selects the indefinite detection result highest in action category likelihood from the indefinite detection results, and then removes the indefinite detection result as a definite detection result from the indefinite detection results. The detection unit 124 computes the tIoU between the selected definite detection result and the other indefinite detection results, and removes an indefinite detection result having the criterion value or more in tIoU, as a rejection detection result from the indefinite detection results. The detection unit 124 repeats the processing until no indefinite detection result remains.

Exemplary NMS processing in a case where the correction time periods 401, 402, and 403 are, respectively, 0.9, 0.7, and 0.3 in action category likelihood, will be given below.

The detection unit 124 first removes the correction time period 404 highest in action category likelihood, as a definite detection result from the indefinite detection results. The detection unit 124 removes, as a rejection detection result, the correction time period 402 of which the tIoU to the correction time period 401 is larger than the criterion value 0.5. Next, the detection unit 124 removes, as a definite detection result, the correction time period 403 highest in action category likelihood, in the remaining indefinite detection result. As a result, no indefinite detection result remains, and thus the NMS processing finishes.

Similarly, the detection unit 124 performs the NMS processing to correction time periods 404, 405, and 406 corresponding to the action category (A2) ("motion in which merchandise is returned to a shelf") and outputs the correction time periods 405 and 406 as definite detection results.

Figure 5:
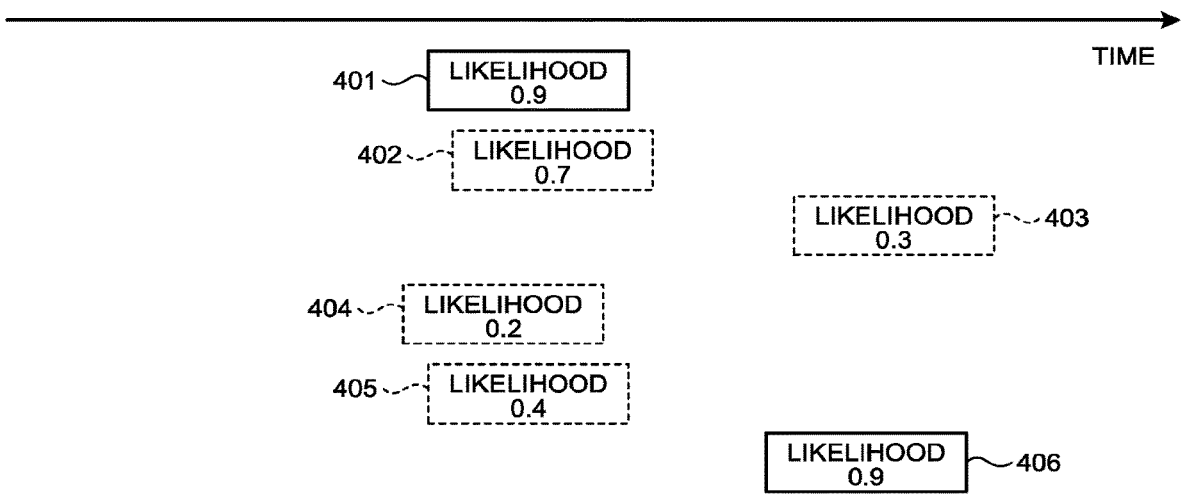
FIG. 5 illustrates exemplary NMS processing that is performed with no distinction between categories.

Next, an example in which the NMS processing is performed with no distinction between categories, will be given. FIG. 5 illustrates exemplary NMS processing that is performed with no distinction between categories. Similar to FIG. 4, the correction time periods 401 to 406 are stored in the time-period storage 114.

In a case where the NMS processing is performed with no distinction between categories, the detection unit 124 performs the NMS processing to the correction time periods 401 to 406 such that the estimation result corresponding to a correction time period high in action category likelihood with no distinction between categories is removed as a definite detection result. As a result, in the example of FIG. 5, the correction time periods 401 and 406 are output as definite detection results.

For example, the detection unit 124 outputs information including an action category name added to a definite detection result acquired as a result of the NMS processing, to the output control unit 125. For example, the action category name in association with the action category is stored in the storage 113, so as to be referenced by the detection unit 124.

The detection unit 124 may eliminate a correction time period high in the likelihood of non-occurrence of an action (second likelihood). In this case, for example, the estimation unit 123 uses an estimation model that has learnt so as to output the likelihood of non-occurrence of a previously determined action in addition to the action category likelihood. For example, in a case where the likelihood of non-occurrence of an action is larger than any other action category likelihoods, the detection unit 124 eliminates the estimation result including the corresponding correction time period, as a rejection detection result. This arrangement enables reduction of erroneous detection (over detections).

Referring back to FIG. 1, the output control unit 125 controls output of various types of information that the detection apparatus 100 processes. For example, the output control unit 125 acquires a set of the detected action category name, action category likelihood, detection time period, and the moving image of the corresponding time period, from the detection result output by the detection unit 124 and the recording stored in the storage 113, and then stores the set in the storage 113.

Moreover, in a case where the detected action category is an action category of which the user needs to be notified, such as a criminal act (e.g., shoplifting), the output control unit 125 causes the output unit 103 to output, for example, information for calling watchman's attention.

Each unit above (feature computing unit 102 and control unit 120) is achieved, for example, by one or more processors. For example, each unit above may be achieved by causing a processor, such as a central processing unit (CPU), to execute a program, namely, by software. Each unit above may be achieved by a processor, such as a dedicated integrated circuit (IC), namely, by hardware. Each unit above may be achieved by a combination of software and hardware. In a case where a plurality of processors is used, each processor may achieve any one of the units or any two or more of the units.

Figure 6:
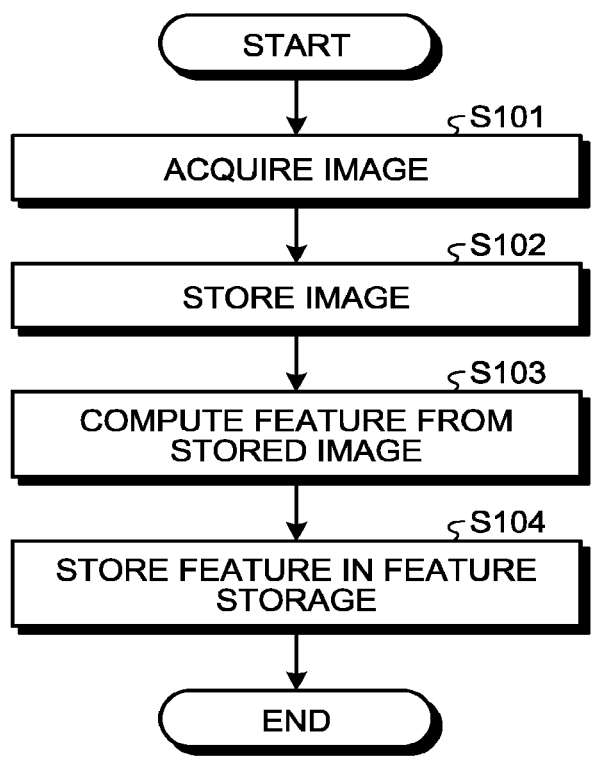
FIG. 6 is a flowchart of feature extraction processing in the first embodiment.

Next, feature extraction processing that is performed by the detection apparatus 100 according to the first embodiment, having such a configuration, will be described. The feature extraction processing is processing of extracting a feature from a shot moving image. FIG. 6 is a flowchart of exemplary feature extraction processing in the first embodiment.

The camera 101 shoots, for example, a monitoring target area and acquires a time-series image (moving image) (Step S101). The camera 101 stores the acquired moving image in the image storage 111 (Step S102). For example, every certain time interval, the feature computing unit 102 computes a feature from the moving image stored in the image storage 111 (Step S103). The feature computing unit 102 stores the computed feature in the feature storage 112 (Step S104).

In this manner, a moving image is continuously stored in the image storage 111. Moreover, every certain time interval, continuously, a feature is stored in the feature storage 112.

Figure 7:
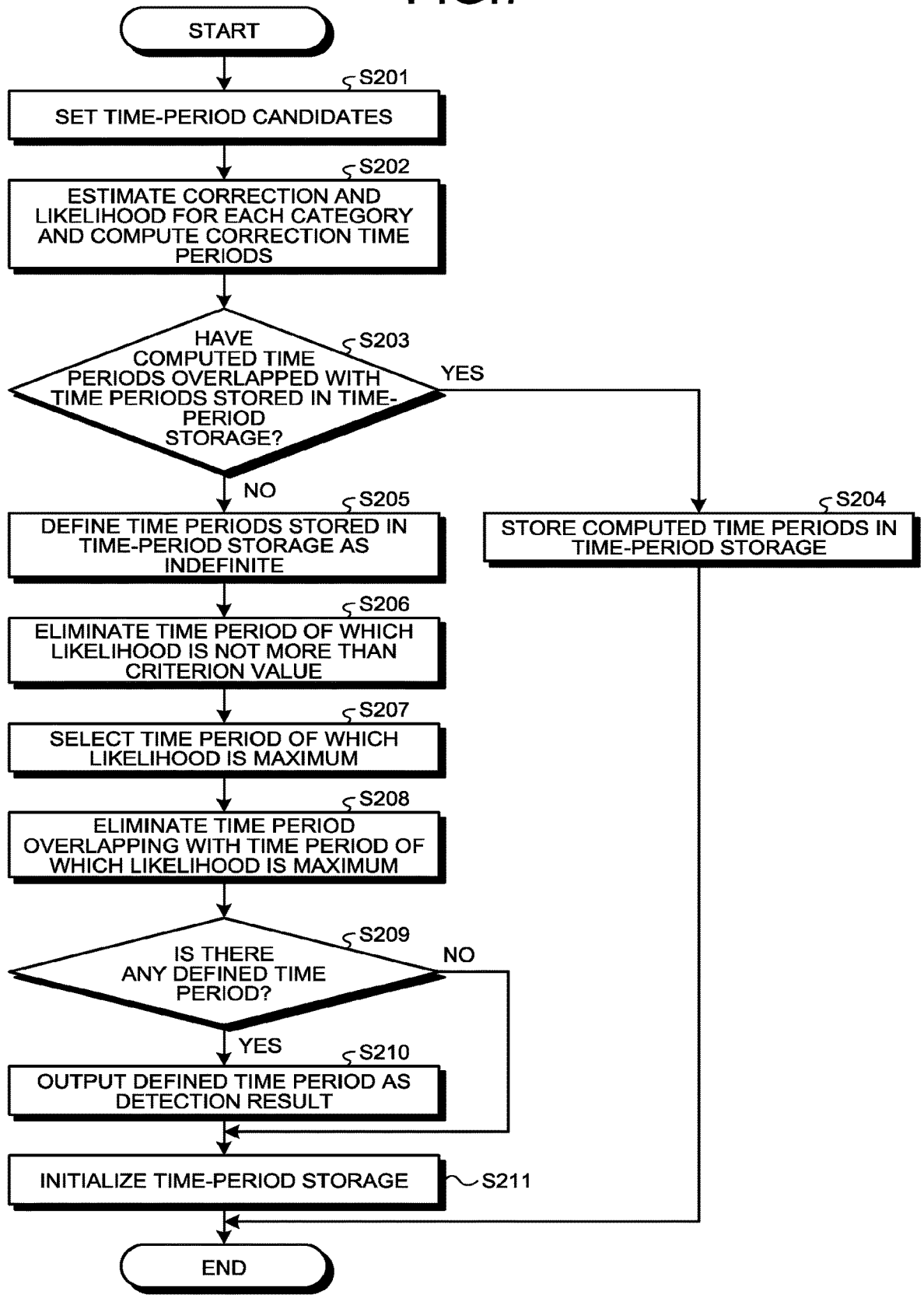
FIG. 7 is a flowchart of detection processing in the first embodiment.

Next, detection processing that is performed by the detection apparatus 100, will be described. The detection processing is processing of detecting the category of an action and the time period of occurrence of the action from the moving image, with the feature extracted by the feature extraction processing. FIG. 7 is a flowchart of exemplary detection processing in the first embodiment.

For example, every elapse of a certain time, the detection processing is performed with a plurality of features having a prescribed length stored in the feature storage 112 at the point in time. For example, the certain time is shorter than a time corresponding to a prescribed length of features stored in the feature storage 112. This arrangement enables use of features being gradually shifted (slid) as input to the detection processing.

The setting unit 122 reads the time-period candidates stored, for example, in the storage 113, and sets time-period candidates on the basis of the read information (Step S201). The estimation unit 123 inputs the feature acquired by the acquisition unit 121 from the feature storage 112 and the set time-period candidates, to the estimation model, and estimates a correction and a likelihood for each action category. The estimation unit 123 corrects each time-period candidate in accordance with the correction, to compute a correction time period (Step S202).

The detection unit 124 determines whether the correction time periods computed by the estimation unit 123 has overlapped with the correction time periods already stored in the time-period storage 114 (Step S203). The determination is a determination of whether a correction time period is out of date, and corresponds to, for example, the above (R1). The detection unit 124 may make a determination in accordance with the above (R2) or other criteria.

For overlap (Step S203: Yes), the estimation unit 123 stores estimation results including the computed correction time periods, in the time-period storage 114 (Step S204), and then the detection processing finishes. For non-overlap (Step S203: No), the detection unit 124 performs processing of computing a definite detection result as below.

That is the detection unit 124 defines, as indefinite detection results, the estimation results including the correction time periods already stored in the time-period storage 114 (Step S205). The detection unit 124 eliminates an indefinite detection result including the correction time period of which the action category likelihood is not more than the criterion value (Step S206). The detection unit 124 selects, as a definite detection result, an indefinite detection result including the correction time period of which the action category likelihood is maximum, from the remaining indefinite detection results (Step S207). The detection unit 124 performs the NMS processing as above to eliminate an indefinite detection result including the correction time period large in overlap with the correction time period included in the selected definite detection result (Step S208).

The detection unit 124 determines whether a definite detection result has been acquired (Step S209). For example, in a case where there is no correction time period of which the action category likelihood is larger than the criterion value, it is determined that no definite detection result has been acquired.

In a case where a definite detection result has been acquired (Step S209: Yes), the detection unit 124 outputs, as a detection result, the defined correction time period and the action category likelihood to the output control unit 125. The output control unit 125 acquires a set of the detected action category name, action category likelihood, detection time period, and the moving image of the corresponding time period, from the detection result output by the detection unit 124 and the recording stored in the storage 113, and then stores the set in the storage 113 (Step S210). Moreover, in a case where the detected action category is a notification target, the output control unit 125 causes the output unit 103 to output information corresponding to the notification target.

The detection unit 124 deletes the estimation results including the correction time periods subjected to the processing in Steps S205 to S210, from the time-period storage 114 (Step S211), and then the detection processing finishes.

As described above, the detection apparatus according to the first embodiment estimates action every category with the estimation model and additionally computes a proper time period. This arrangement enables improvement in the accuracy of time-period detection and improvement in the accuracy of action category detection.

For example, in a system that shoots a monitoring target area, such as commercial facilities, and detects an action, a proper time period can be computed every monitoring target action from previously determined candidate time periods.

Therefore, the time period of occurrence of a monitoring target action and the action category likelihood in a detection result can be computed with high accuracy. Moreover, for example, the action category name in the detection result and the moving image of the corresponding time period can be output so as to be verified by the user.

Moreover, according to the present embodiment, a feature computed continuously is acquired every certain time interval, and action estimation results acquired every certain time interval are integrated, so that a final detection result can be acquired. That is an action based on a moving image can be continuously detected frequently.

Second Embodiment

Figure 8:
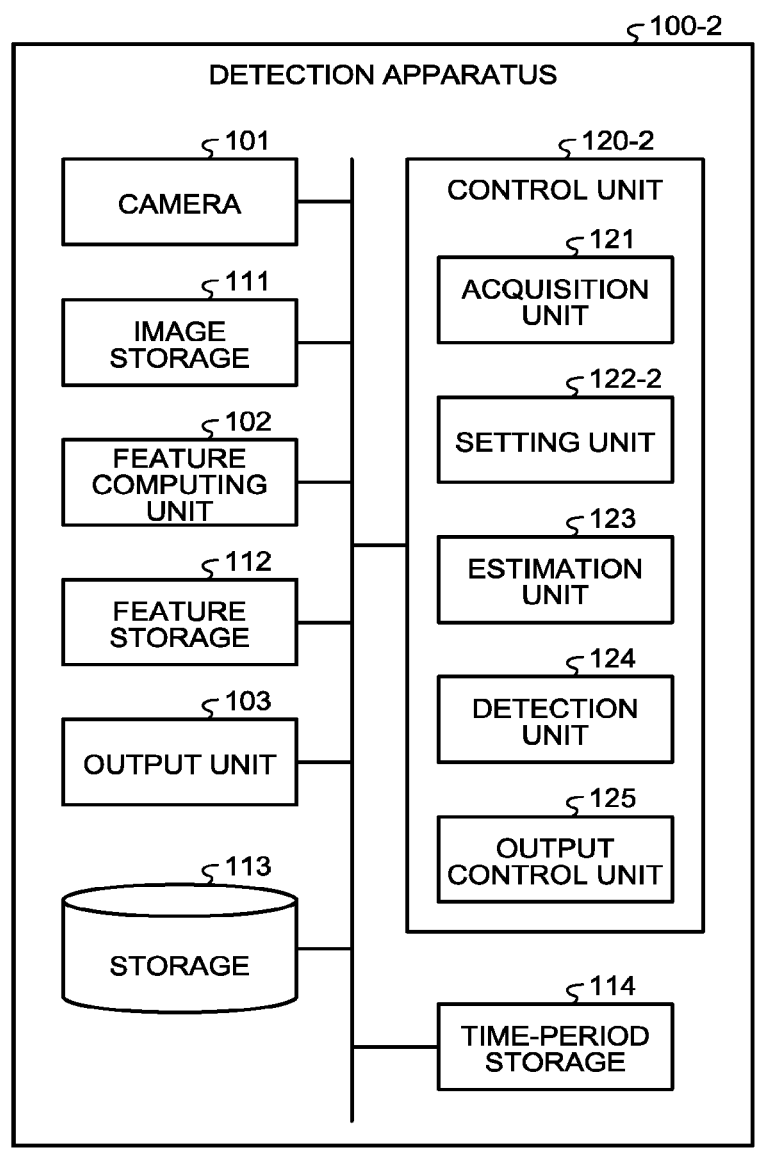
FIG. 8 is a block diagram of a detection apparatus according to a second embodiment.

A detection apparatus according to a second embodiment further has a function of adjusting a time-period candidate. FIG. 8 is a block diagram of an exemplary configuration of the detection apparatus 100-2 according to the second embodiment. As illustrated in FIG. 8, the detection apparatus 100-2 includes a camera 101, image storage 111, a feature computing unit 102, feature storage 112, an output unit 103, storage 113, time-period storage 114, and a control unit 120-2.

The function of a setting unit 122-2 included in the control unit 120-2 according to the second embodiment is different from that according to the first embodiment. The other configurations and functions are similar to those in FIG. 1 that is a block diagram of the detection apparatus 100 according to the first embodiment. Thus, the other configurations and functions are denoted with the same reference signs and the descriptions thereof will be omitted herein.

The setting unit 122-2 further has a function of adjusting a time-period candidate on the basis of the tendency of a correction time period stored in the time-period storage 114. For example, the setting unit 122-2 computes a time-period candidate resulting from correction of a time-period candidate previously set in the storage 113 with use of the start time and the finish time of a past correction time period stored in the time-period storage 114. For example, the corrected time-period candidate is used in addition to the previously set time-period candidate. The corrected time-period candidate may be used instead of the previously set time-period candidate.

This arrangement enables a time-period candidate to be set to a time period in which the possibility that an action is occurring is high, so that an action can be detected with higher accuracy.

The setting unit 122-2 computes a time-period candidate based on a past correction time period, for example, with the following methods.

Statistical Clustering Method

For example, the setting unit 122-2 applies a statistical clustering method to the respective start times and finish times of a plurality of correction time periods stored in the time-period storage 114, and computes a plurality of clusters each including correction time periods mutually similar in start time and finish time. The setting unit 122-2 computes measures of central tendency (e.g., the mean or the median) of the respective start times and finish times of the correction time periods in each cluster. The setting unit 122-2 defines the measures of central tendency as the start time and the finish time of a new time-period candidate.

Nonparametric Method

For example, the setting unit 122-2 acquires a model of approximating the respective start times and finish times of a plurality of correction time periods stored in the time-period storage 114. On the basis of the acquired model, the setting unit 122-2 samples a start time and a finish time in accordance with a value indicated by the model, and sets a time-period candidate determined on the basis of the sampled start time and finish time.

The setting unit 122-2 may computes a start time and a finish time largest in frequency as the start time and the finish time of a new time-period candidate.

Figure 9:
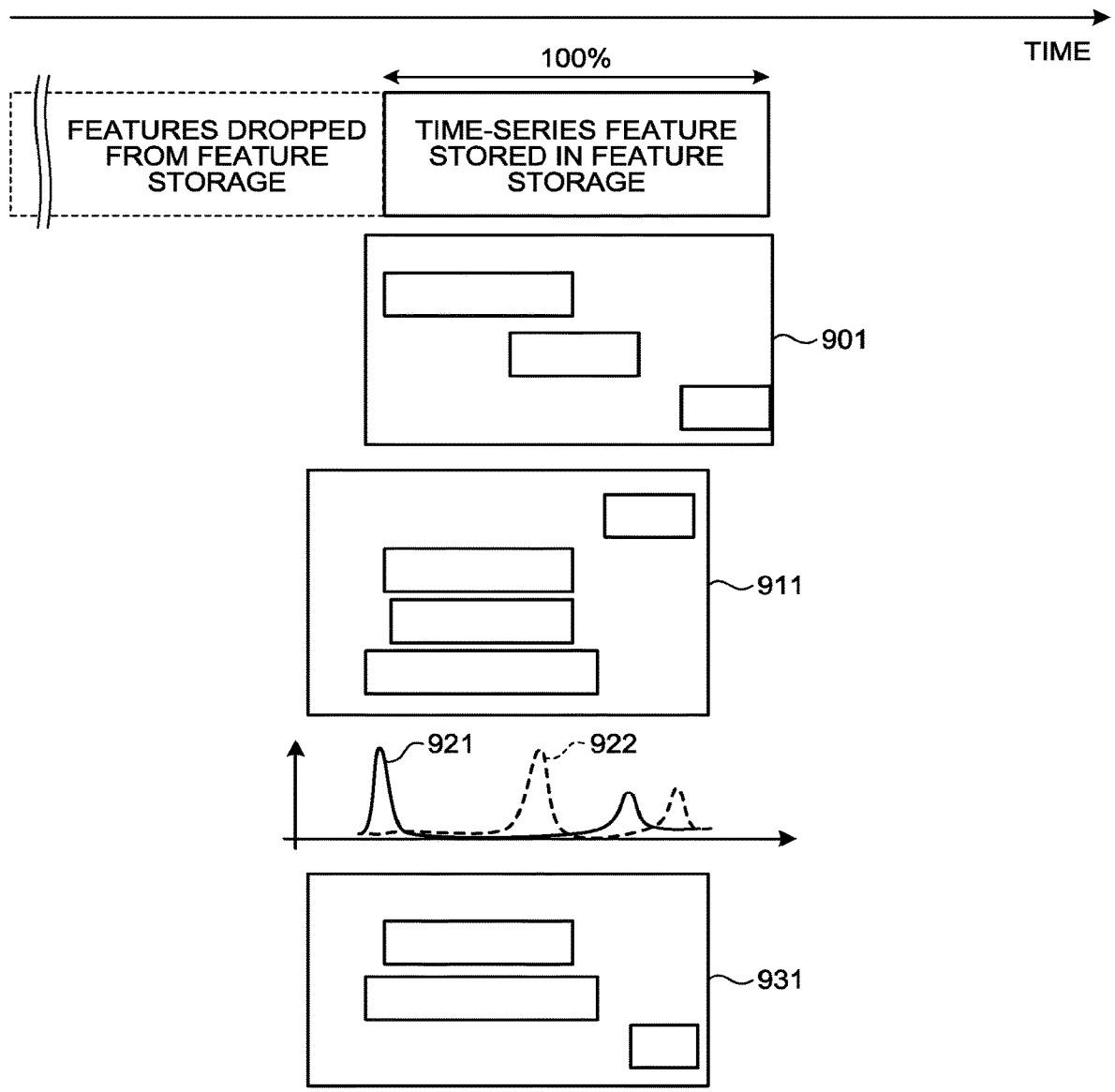
FIG. 9 illustrates exemplary generation of time-period candidates with a nonparametric method.

FIG. 9 illustrates exemplary generation of time-period candidates with a nonparametric method. A time-period candidate group 901 includes, for example, a plurality of time-period candidates previously determined. A correction time-period group 911 includes, for example, correction time periods stored in the time-period storage 114.

The setting unit 122-2 computes a model 921 fitting the start times of the correction time periods included in the correction time-period group 911 and a model 922 fitting the finish times thereof. The setting unit 122-2 samples the same number of times from each of the models 921 and 922. The setting unit 122-2 generates, as new time-period candidates, time periods determined with the sampled start times and finish times. FIG. 9 illustrates that respective three times are sampled and three additional time-period candidates are generated. A correction time-period group 931 indicates such generated correction time periods.

Figure 10:
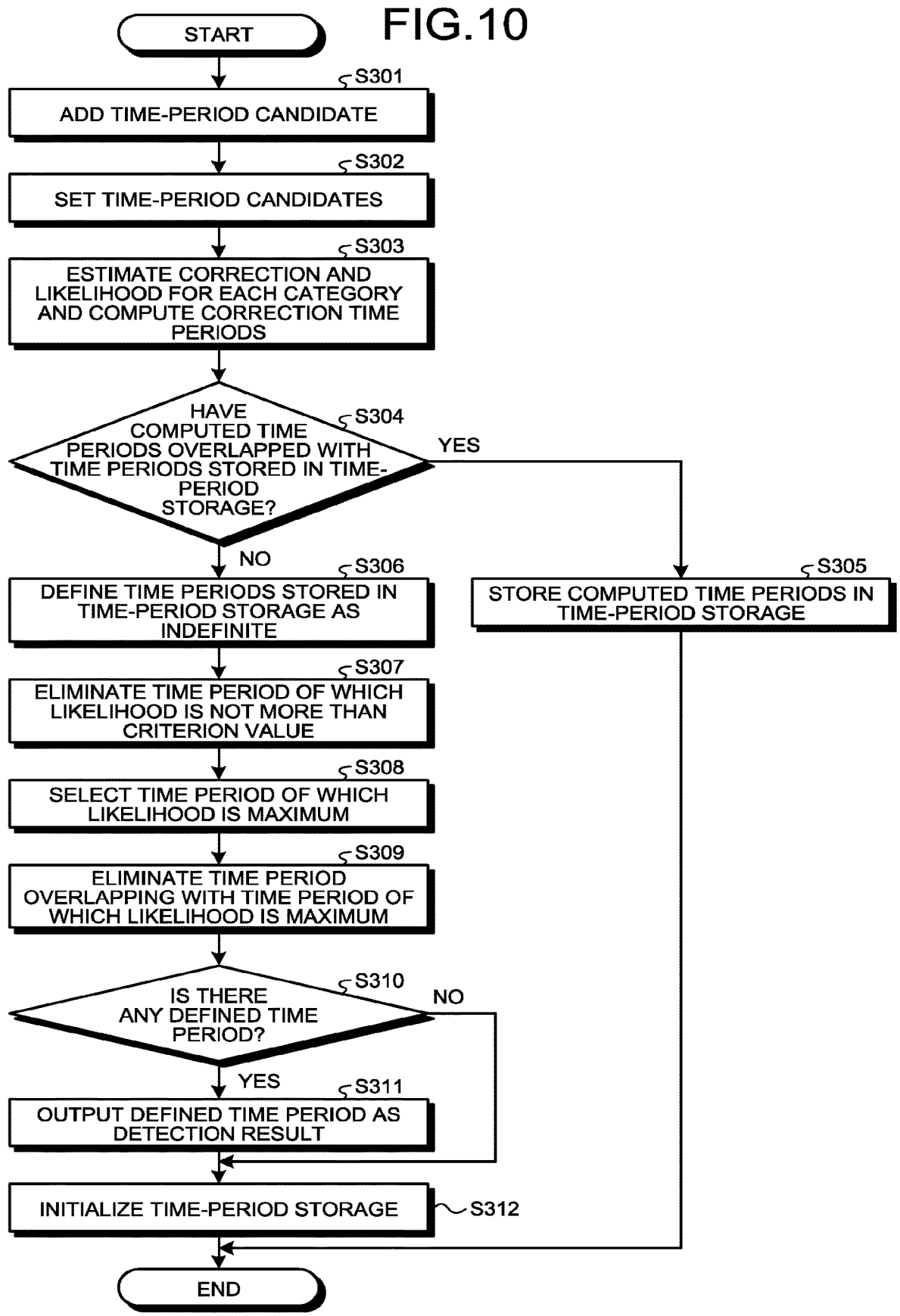
FIG. 10 is a flowchart of detection processing in the second embodiment.

Next, detection processing that is performed by the detection apparatus 100-2 according to the second embodiment, having such a configuration, will be described with FIG. 10. FIG. 10 is a flowchart of exemplary detection processing in the second embodiment.

The setting unit 122-2 generates a new time-period candidate with use of a method as above, and adds the new time-period candidate to the time-period candidates stored in the storage 113, for example (Step S301). The setting unit 122-2 sets time-period candidates inclusive of the added time-period candidate as time-period candidates to be used in the subsequent processing (Step S302).

The processing from Step S303 to Step S312 is similar to the processing from Step S202 to Step S211 in the detection apparatus 100 according to the first embodiment, and thus the description thereof will be omitted.

As described above, according to the second embodiment, with reference to the start time and the finish time of a past correction time period, a new time-period candidate can be computed so as to be used. This arrangement enables a time-period candidate to be set to a time period in which the possibility that an action is occurring is high, so that an action can be detected with higher accuracy.

The setting unit 122-2 may set, as time-period candidates, part or all of the correction time periods stored in the time-period storage 114. In this case, for example, the statistical clustering method or the nonparametric method is not necessarily applied.

For example, the number of time-period candidates, the start time, and the relative position are previously determined by a user and are stored in the storage 113. In some cases, a correction time period to be estimated deviates largely from a previously determined time period, resulting in a large correction. In consideration of such a case, the setting unit 122-2 may have a function of updating (correcting) a time-period candidate stored in the storage 113, for example, on the basis of a past estimation result.

For example, with reference to the detection result of previously-determined periods or the number of previously-determined periods in the past, the setting unit 122-2 computes the difference between an estimated correction time period and the corresponding time-period candidate. The setting unit 122-2 corrects the time-period candidate such that the difference decreases, and stores the corrected time-period candidate in the storage 113. Such processing enables more proper setting of a time-period candidate, for example, in relative position and in length, so that further improvement can be made in detection accuracy.

Third Embodiment

According to the first and second embodiments, a correction time period is computed with a prescribed length of features stored in the feature storage 112 all. Such a method enables detection of an action, based on a global feature corresponding to the entirety of the prescribed length. Meanwhile, use of part of the features enables detection of an action, based on a local feature having a length shorter than the prescribed length (local feature).

Figure 11:
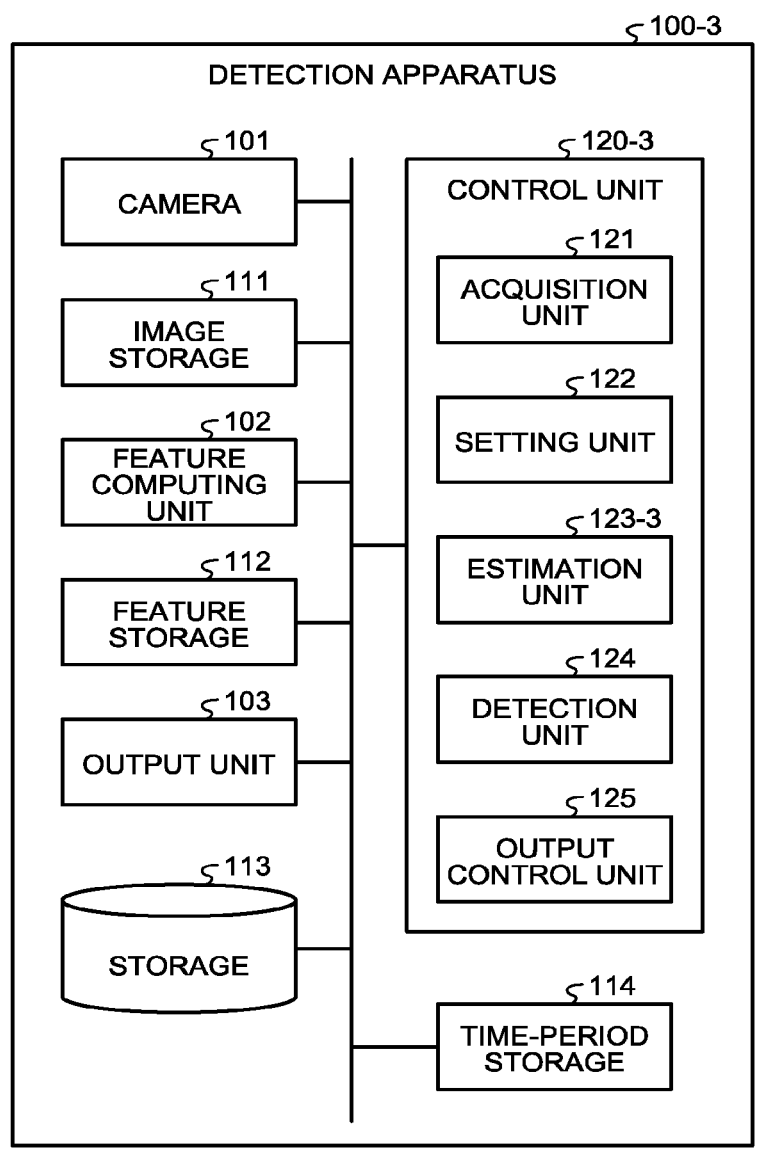
FIG. 11 is a block diagram of a detection apparatus according to a third embodiment.

A detection apparatus according to a third embodiment further has a function of detecting an action with a local feature. FIG. 11 is a block diagram of an exemplary configuration of the detection apparatus 100-3 according to the third embodiment. As illustrated in FIG. 11, the detection apparatus 100-3 includes a camera 101, image storage 111, a feature computing unit 102, feature storage 112, an output unit 103, storage 113, time-period storage 114, and a control unit 120-3.

The function of an estimation unit 123-3 included in the control unit 120-3 according to the third embodiment is different from that according to the first embodiment. The other configurations and functions are similar to those in FIG. 1 that is a block diagram of the detection apparatus 100 according to the first embodiment. Thus, the other configurations and functions are denoted with the same reference signs and the descriptions thereof will be omitted herein.

The estimation unit 123-3 has the following additional function, compared to the estimation unit 123 of the first embodiment. That is, the estimation unit 123-3 computes a correction time period, with an estimation model (estimation model MA), and then computes a local feature (second feature) that is a feature corresponding to the computed correction time period. Then, the estimation unit 123-3 inputs the local feature to another estimation model MB (second model), and acquires a likelihood correction and a time-period re-correction output from the estimation model MB. For example, the estimation model MB learns in advance so as to input a local feature thereto and output a likelihood correction and a time-period re-correction.

The likelihood correction indicates the amount of correction to an action category likelihood estimated by the estimation model MA. For example, the estimation unit 123-3 multiplies the action category likelihood by the likelihood correction, so that the action category likelihood can be corrected. The time-period re-correction indicates the amount of further correction to a correction time period corrected in accordance with a correction estimated by the estimation model MA (first correction time period). For example, the time-period re-correction includes the amount of shifting in time and the amount of scaling in time. The estimation unit 123-3 performs time shifting or time scaling in accordance with the time-period re-correction, so that a correction time period resulting from further correction of the correction time period (first correction time period) can be acquired (second correction time period).

Figure 12:
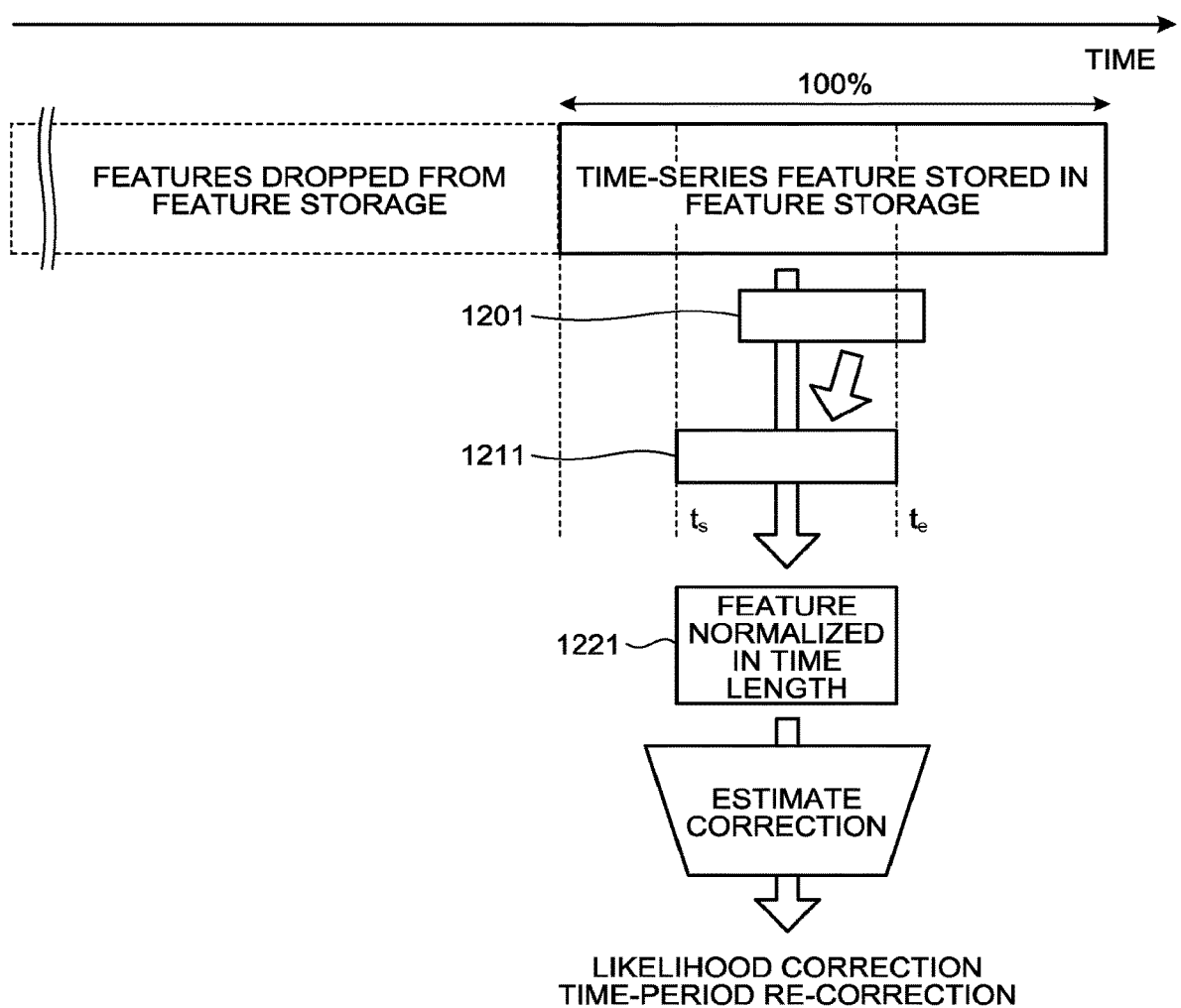
FIG. 12 is an explanatory diagram of an exemplary processing procedure that is performed by an estimation unit in the third embodiment.

For example, the local feature, the likelihood correction, and the time-period re-correction are computed in the following procedure. FIG. 12 is an explanatory diagram of an exemplary processing procedure that is performed by the estimation unit 123-3.

The estimation unit 123-3 estimates a correction time period 1211 corresponding to an action category, from a time-period candidate 1201. The estimation unit 123-3 acquires a feature corresponding to the time period determined by the start time $t_s$ and the finish time $t_e$ of the correction time period 1211, from the features stored in the feature storage 112. For example, the estimation unit 123-3 applies one-dimensional average pooling to the acquired feature, and computes a time-series feature 1221 having a length of time normalized to a fixed length. The reason of normalization of a feature is that the length of a feature to be input to the estimation model MB needs to be constant. As long as the length of a time-series feature can be made constant, any normalization method different from the one-dimensional average pooling may be applied.

The estimation unit 123-3 inputs the computed feature 1221 to the estimation model MB, to estimate a likelihood correction and a time-period re-correction.

The estimation unit 123-3 multiplies the action category likelihood of the corresponding action category estimated by the estimation model MA, by the likelihood correction, to compute a corrected action category likelihood. Next, the estimation unit 123-3 computes a time period resulting from application of the time-period re-correction to the correction time period corrected in accordance with the correction estimated by the estimation model MA (re-correction time period). The estimation unit 123-3 adds the corrected action category likelihood and the re-correction time period acquired as above, to the time-period storage 114.

Processing that is performed by a detection unit 124 with a correction time period stored in the time-period storage 114, is similar to that according to the first embodiment. Note that the detection unit 124 performs detection processing with an estimation result including the corrected action category likelihood and the re-correction time period added by the estimation unit 123-3 in addition to the estimation result from the estimation model MA. The detection unit 124 may perform detection processing with only the estimation result including the corrected action category likelihood and the re-correction time period added by the estimation unit 123-3.

Figure 13:
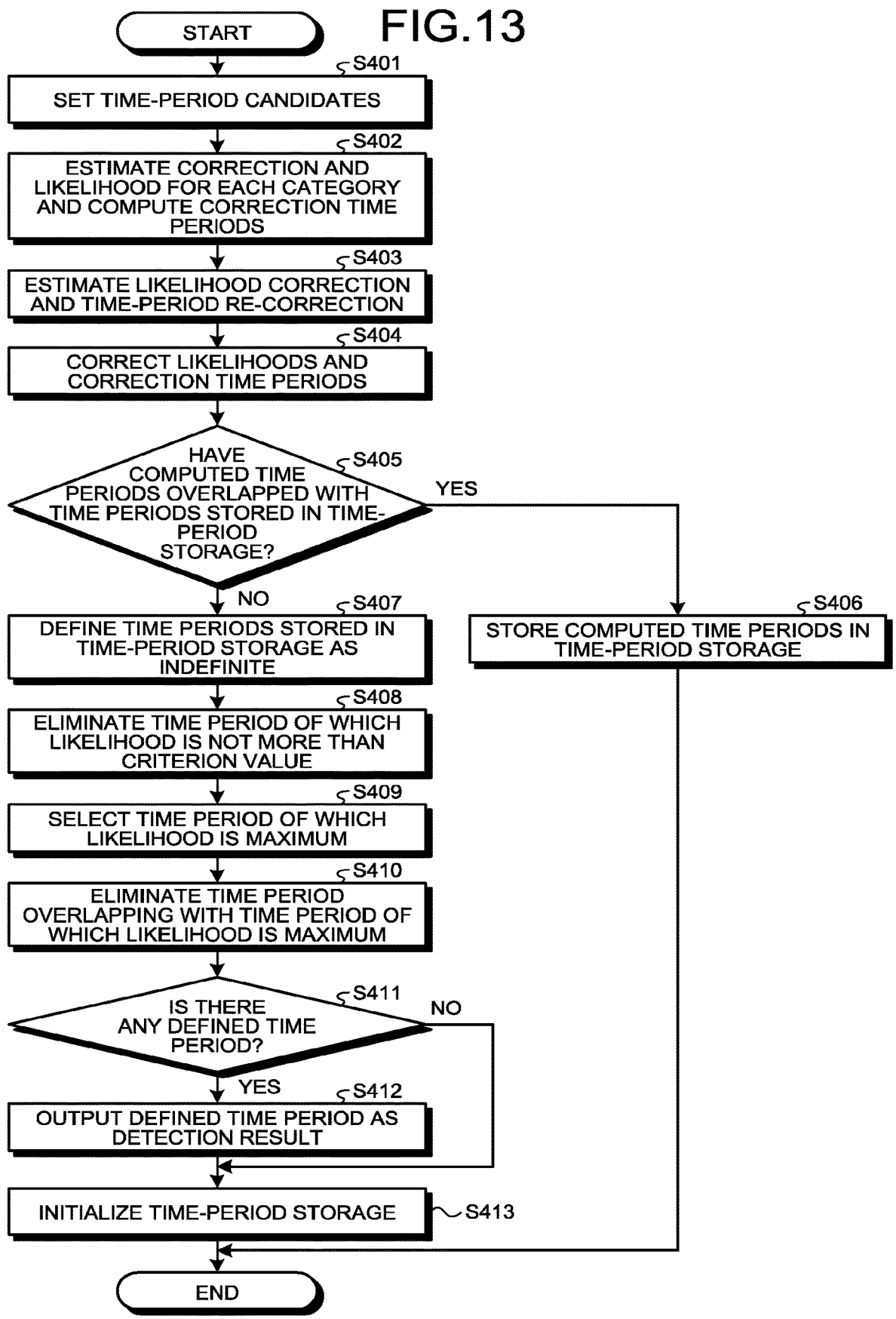
FIG. 13 is a flowchart of detection processing in the third embodiment.

Next, detection processing that is performed by the detection apparatus 100-3 according to the third embodiment, having such a configuration, will be described with FIG. 13. FIG. 13 is a flowchart of exemplary detection processing in the third embodiment.

Steps S401 and S402 are similar to Steps S201 and S202 in the detection apparatus 100 according to the first embodiment.

The estimation unit 123-3 acquires a feature (local feature) corresponding to an estimated correction time period in Step S402 and inputs the local feature to the estimation model MB, to estimate a likelihood correction and a time-period re-correction (Step S403). The estimation unit 123-3 corrects the likelihood and the correction time period acquired in Step S402, respectively, with the likelihood correction and the time-period re-correction acquired in Step S403, and then adds the corrected likelihood and correction time period to the time-period storage 114 (Step S404).

The processing from Step S405 to Step S413 is similar to the processing from Step S203 to Step S211 in the detection apparatus 100 according to the first embodiment, and thus the description thereof will be omitted.

As described above, the detection apparatus according to the third embodiment computes the action category likelihood and the time period of occurrence of an action from a feature corresponding to a correction time period for each action category computed on the basis of the estimation model MA. This arrangement enables further improvement in detection performance for an action time period.

Note that, although a local feature corresponding to a computed correction time period is used above, a local feature corresponding to a time-period candidate may be used. For example, in addition to the time-series feature stored in the feature storage 112 (first feature), the estimation unit 123-3 may input a feature corrected such that the time-series feature corresponds to a time-period candidate (second feature), to the estimation model (MA). The corrected feature may be normalized so as to have the length of a feature to be input to the estimation model MA. The estimation unit 123-3 may input only the feature corrected such that the time-series feature stored in the feature storage 112 corresponds to a time-period candidate (second feature), to the estimation model MA.

As described above, according to the first to third embodiments, the accuracy of time-period detection and the accuracy of action category detection can be improved.

Figure 14:
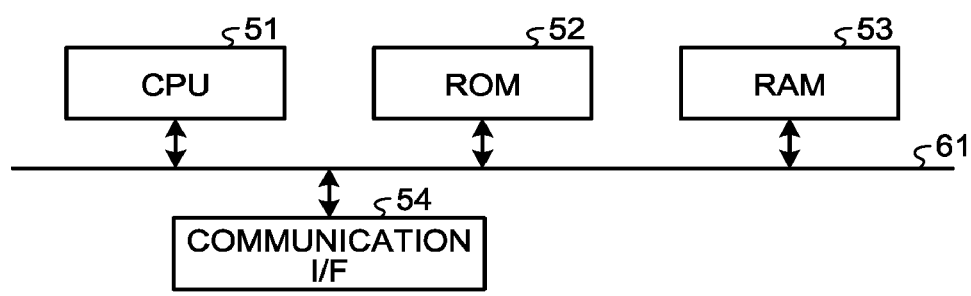
FIG. 14 is a diagram of the hardware configuration of the detection apparatus according to any of the first to third embodiments.

Next, the hardware configuration of the detection apparatus according to any of the first to third embodiments, will be described with FIG. 14. FIG. 14 is an explanatory diagram of an exemplary hardware configuration of the detection apparatus according to any of the first to third embodiments.

The detection apparatus according to any of the first to third embodiments includes a control device, such as a central processing unit 51, storage devices, such as a read only memory (ROM) 52 and a random access memory (RAM) 53, a communication I/F 54 that performs communication in connection with a network, and a bus 61 through which each unit is connected.

A program that is executed in the detection apparatus according to any of the first to third embodiments is previously installed, for example, in the ROM 52 for provision.

The program that is executed in the detection apparatus according to any of the first to third embodiments may be recorded, in the form of an installable or executable file, on a computer-readable recording medium, such as a compact disk read only memory (CD-ROM), a flexible disk (FD), a compact disk recordable (CD-R), or a digital versatile disk (DVD), for provision as a computer program product.

Furthermore, the program that is executed in the detection apparatus according to any of the first to third embodiments may be stored in a computer connected with a network, such as the Internet, and may be downloaded for provision through the network. Moreover, the program that is executed in the detection apparatus according to any of the first to third embodiments may be provided or distributed through a network, such as the Internet.

The program that is executed in the detection apparatus according to any of the first to third embodiments causes a computer to function as each unit in the detection apparatus described above. The CPU 51 is capable of loading the program from a computer-readable recording medium onto a main storage device and executing the program for the computer.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A detection apparatus comprising:
one or more processors configured to:
set at least one time-period candidate previously determined;
input, to a first model that inputs a feature acquired from a plurality of time-series images and the at least one time-period candidate and outputs, for each of a plurality of actions previously determined as detection targets, a first likelihood indicating a likelihood of occurrence of the each of the plurality of actions and correction information for acquisition of at least one correction time period resulting from correction of the at least one time-period candidate, the feature and the at least one time-period candidate,
acquire the first likelihood and the correction information output from the first model; and
detect, based on the at least one correction time period acquired based on the correction information and the first likelihood, at least one of the actions included in the time-series images and a start time and a finish time of a time period of occurrence of the at least one of the actions, wherein
the at least one time-period candidate is commonly determined for the plurality of actions, and
the one or more processors
input, to the first model, a first feature acquired from the plurality of time-series images and the at least one time-period candidate, and acquire the first likelihood and the correction information, and
input, to a second model that inputs a feature and outputs a likelihood correction indicating a correction to a likelihood of occurrence of an action and a time-period re-correction indicating a correction to a correction time period, a second feature corresponding to a first correction time period acquired based on the correction information, and acquire the likelihood correction and the time-period re-correction output from the second model, and
detect, based on a second correction time period resulting from correction of the first correction time period with the time-period re-correction and a second likelihood resulting from correction of the first likelihood with the likelihood correction, the at least one of the actions included in the time-series images, the start time, and the finish time.

2. The detection apparatus according to claim 1, wherein the one or more processors
input, to the first model, a plurality of features acquired periodically and the at least one time-period candidate, and acquire a plurality of first likelihoods and a plurality of pieces of correction information output from the first model, and
detect, from a plurality of the correction time periods acquired based on the plurality of pieces of correction information, a start time and a finish time of the correction time period of which the first likelihood is larger than the first likelihood of the remaining correction time period, and the at least one of the actions corresponding to the correction time period.

3. The detection apparatus according to claim 2, wherein the one or more processors add, as a new time-period candidate, at least one time period acquired based on the plurality of the correction time periods acquired to the plurality of features.

4. The detection apparatus according to claim 1, wherein the one or more processors correct the at least one time-period candidate such that a difference between the at least one correction time period and the at least one time-period candidate decreases.

5. The detection apparatus according to claim 1, wherein the first model further outputs a second likelihood indicating a likelihood of non-occurrence of the each of the plurality of actions, and
the one or more processors detect, based on the correction time period, the first likelihood, and the second likelihood, the at least one of the actions included in the plurality of time-series images and the start time and the finish time of the time period of occurrence of the at least one of the actions.

6. The detection apparatus according to claim 1, wherein the one or more processors select the at least one time-period candidate corresponding to the feature from a plurality of time-period candidates, and set the time-period candidate selected.

7. The detection apparatus according to claim 1, wherein the one or more processors
detect, based on the first correction time period, the second correction time period resulting from correction of the first correction time period with the time-period re-correction, the first likelihood, and the second likelihood resulting from correction of the first likelihood with the likelihood correction, the at least one of the actions included in the time-series images, the start time, and the finish time.

8. The detection apparatus according to claim 1, wherein the one or more processors input, to the first model, a first feature acquired from the plurality of time-series images and a second feature corrected such that the first feature corresponds to the at least one time-period candidate, and acquire the first likelihood and the correction information output from the first model.

9. The detection apparatus according to claim 1, wherein the one or more processors input, to the first model, a second feature corrected such that a first feature acquired from a plurality of time-series images corresponds to the at least one time-period candidate, and acquire the first likelihood and the correction information output from the first model.

10. The detection apparatus according to claim 1, wherein the correction information indicates a correction with which the at least one time-period candidate is corrected to a time period of which the first likelihood is larger than the first likelihoods of other time periods or a time period resulting from correction of the at least one time-period candidate to a time period of which the first likelihood is larger than the first likelihoods of other time periods.

11. A detection method comprising:
a setting step of setting at least one time-period candidate previously determined;
an estimation step of inputting, to a first model that inputs a feature acquired from a plurality of time-series images and the at least one time-period candidate and outputs, for each of a plurality of actions previously determined as detection targets, a first likelihood indicating a likelihood of occurrence of the each of the plurality of actions and correction information for acquisition of at least one correction time period resulting from correction of the at least one time-period candidate, the feature and the at least one time-period candidate, and acquiring the first likelihood and the correction information output from the first model; and
a detection step of detecting, based on the at least one correction time period acquired based on the correction information and the first likelihood, at least one of the actions included in the time-series images and a start time and a finish time of a time period of occurrence of the at least one of the actions, wherein
the at least one time-period candidate is commonly determined for the plurality of actions,
the estimation step includes
inputting, to the first model, a first feature acquired from the plurality of time-series images and the at least one time-period candidate, and acquiring the first likelihood and the correction information, and
inputting, to a second model that inputs a feature and outputs a likelihood correction indicating a correction to a likelihood of occurrence of an action and a time-period re-correction indicating a correction to a correction time period, a second feature corresponding to a first correction time period acquired based on the correction information, and acquiring the likelihood correction and the time-period re-correction output from the second model, and
the detection step includes detecting, based on a second correction time period resulting from correction of the first correction time period with the time-period re-correction and a second likelihood resulting from correction of the first likelihood with the likelihood correction, the at least one of the actions included in the time-series images, the start time, and the finish time.

12. A computer program product having a non-transitory computer readable medium including programmed instructions, wherein the instructions, when executed by a computer, cause the computer to perform:
a setting step of setting at least one time-period candidate previously determined;
an estimation step of inputting, to a first model that inputs a feature acquired from a plurality of time-series images and the at least one time-period candidate and outputs, for each of a plurality of actions previously determined as detection targets, a first likelihood indicating a likelihood of occurrence of the each of the plurality of actions and correction information for acquisition of at least one correction time period resulting from correction of the at least one time-period candidate, the feature and the at least one time-period candidate, and acquiring the first likelihood and the correction information output from the first model; and
a detection step of detecting, based on the at least one correction time period acquired based on the correction information and the first likelihood, at least one of the actions included in the time-series images and a start time and a finish time of a time period of occurrence of the at least one of the actions, wherein
the at least one time-period candidate is commonly determined for the plurality of actions,
the estimation step includes
inputting, to the first model, a first feature acquired from the plurality of time-series images and the at least one time-period candidate, and acquiring the first likelihood and the correction information, and inputting, to a second model that inputs a feature and outputs a likelihood correction indicating a correction to a likelihood of occurrence of an action and a time-period re-correction indicating a correction to a correction time period, a second feature corresponding to a first correction time period acquired based on the correction information, and acquiring the likelihood correction and the time-period re-correction output from the second model, and the detection step includes detecting, based on a second correction time period resulting from correction of the first correction time period with the time-period re-correction and a second likelihood resulting from correction of the first likelihood with the likelihood correction, the at least one of the actions included in the time-series images, the start time, and the finish time.

\* \* \* \* \*